(12) United States Patent
Masui et al.

(10) Patent No.: US 12,007,748 B2
(45) Date of Patent: Jun. 11, 2024

(54) MACHINING CONDITION SEARCH DEVICE AND MACHINING CONDITION SEARCH METHOD

(71) Applicant: Mitsubishi Electric Corporation, Tokyo (JP)

(72) Inventors: Hideyuki Masui, Tokyo (JP); Motoaki Nishiwaki, Tokyo (JP); Kenta Fujii, Tokyo (JP); Kyohei Ishikawa, Tokyo (JP); Masaki Seguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 362 days.

(21) Appl. No.: 17/554,491

(22) Filed: Dec. 17, 2021

(65) Prior Publication Data
US 2022/0107629 A1   Apr. 7, 2022

Related U.S. Application Data

(63) Continuation of application No. PCT/JP2019/025959, filed on Jun. 28, 2019.

(51) Int. Cl.
*G05B 19/4155* (2006.01)
(52) U.S. Cl.
CPC ............ *G05B 19/4155* (2013.01); *G05B 2219/31407* (2013.01)
(58) Field of Classification Search
None
See application file for complete search history.

(56) References Cited

U.S. PATENT DOCUMENTS 10,261,497 B2   4/2019   Koga

FOREIGN PATENT DOCUMENTS

DE   10 2016 117 773 B4   8/2019
JP   2008-36812 A   2/2008
(Continued)

OTHER PUBLICATIONS

International Search Report, issued in PCT/JP2019/025959, dated Aug. 20, 2019.
(Continued)

*Primary Examiner* — Ryan A Jarrett
(74) *Attorney, Agent, or Firm* — BIRCH, STEWART, KOLASCH & BIRCH, LLP

(57) ABSTRACT

A machining condition search device according to the disclosure includes a machining condition generation unit, a practical machining command unit, a machining evaluation unit, a prediction unit, an optimum machining condition calculation unit. The machining condition generation unit generates a machining condition defined by one or more control parameters settable on a machining apparatus. The practical machining command unit causes the machining apparatus to perform machining based on a generated machining condition. The machining evaluation unit generates an evaluation value of performed machining, on the basis of information indicating a machining result of the performed machining. The prediction unit predicts an evaluation value corresponding to a machining condition under which machining is not performed, on the basis of the evaluation value and the machining condition corresponding to the evaluation value. The optimum machining condition calculation unit obtains an optimum machining condition on the basis of a prediction value predicted by the prediction unit and an evaluation value generated by the machining evaluation unit. The optimum machining condition is a machining condition under which an evaluation value is equal to or greater than a threshold and a tolerance is maximum.

9 Claims, 5 Drawing Sheets

(56) References Cited

FOREIGN PATENT DOCUMENTS

JP        2010-42499  A    2/2010
JP        2012-236267 A    12/2012

OTHER PUBLICATIONS

Taiwanese Notification of Reasons for Refusal, issued in the Corresponding Application No. 108143128, dated Nov. 8, 2021.
Written Opinion of the International Searching Authority, issued in PCT/JP2019/025959, dated Aug. 20, 2019.
Office Action dated Feb. 28, 2023 issued in corresponding Chinese Patent Application No. 201980097647.1 with an English Translation.
Office Action dated Sep. 8, 2022 issued in the corresponding German Patent Application No. 112019007433.3 with an English Translation.
Office Action dated Jun. 9, 2022 issued in corresponding Indian Patent Application No. 202147056682.

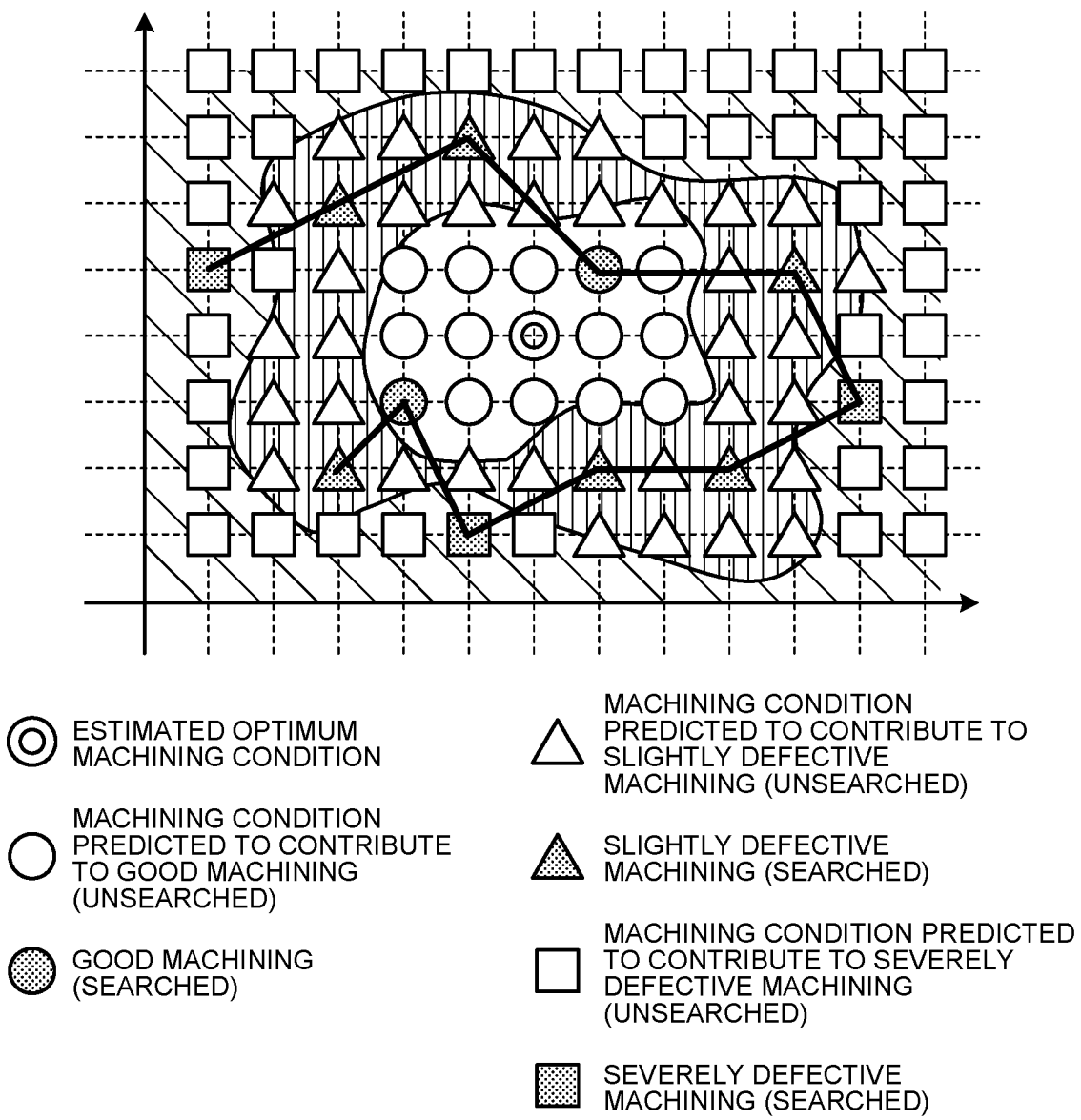

MACHINING CONDITION SEARCH DEVICE AND MACHINING CONDITION SEARCH METHOD

CROSS-REFERENCE TO RELATED APPLICATION

This application is a continuation application of International Application PCT/JP2019/025959, filed on Jun. 28, 2019, and designating the U.S., the entire contents of which are incorporated herein by reference.

BACKGROUND OF THE INVENTION

1. Field of the Invention

The disclosure relates to a machining condition search device and a machining condition search method for searching for a machining condition set on a machining machine so as to obtain an appropriate machining result.

2. Description of the Related Art

Machining apparatuses used in industrial applications each change the shape of a machining target, i.e., a workpiece. There are various materials of the workpiece, such as metal, ceramic, glass, and wood. An example of the machining is removal machining for creating a workpiece into a desired shape by removing an unnecessary portion of the workpiece. The removal machining removes an unnecessary portion of a workpiece by, for example, cutting, polishing or by using electricity or other energy.

In general, a plurality of control parameters can be set on these machining apparatuses. A machining result provided by each machining apparatus depends on a machining condition that is a combination of values of the plurality of control parameters. That is, in order to obtain a desired machining result, it is necessary to set an appropriate machining condition on the machining apparatus. Unfortunately, there are a plurality of control parameters and a settable value of each control parameter is continuous or has plural levels. For this reason, it takes a huge amount of time and effort to select, through trials, a machining condition under which a desired machining result is obtained.

For a sheet metal laser machining apparatus for cutting workpieces such as mild steel of about 5 to 20 mm, using a laser beam, for example, it is demanded that the workpieces be machined to have cut surfaces that satisfy required quality even if the workpieces have various sizes. For such a sheet metal laser machining apparatus, main control parameters having a great influence on a machining result are, for example, five parameters, i.e., laser output, cutting speed, beam magnification, focal position, and gas pressure. Each of the control parameters has values of plural levels, one of which values is selected. Assuming that one of values of eleven levels can be selected for each of the five control parameters, the total number of combinations is 161051. In this case, about 559 days are required for trying 161051 combinations, assuming that it takes five minutes to try one machining condition.

As described above, it takes time and effort to try all combinations in order to select an appropriate machining condition. In view of this, in general, not all combinations are tried and an appropriate machining condition is selected through another method as described in Japanese Patent Application Laid-open No. 2008-036812, for example. For the method described in Japanese Patent Application Laid-open No. 2008-036812, a learning model indicating a relationship between a machining condition and an evaluation value is generated by a function model of, for example, a neural network. Using a prediction result provided by the learning model, a machining condition providing the highest evaluation value is searched for. As a result, the method described in Japanese Patent Application Laid-open No. 2008-036812 makes it possible to obtain a machining condition providing a high evaluation value through a small number of trials.

The method described in Japanese Patent Application Laid-open No. 2008-036812 obtains an optimum machining condition by searching the periphery of the machining condition providing the highest evaluation value, on the basis of the combinations of the machining conditions and the evaluation values obtained through trials. In general, even the same machining conditions set may provide different machining results due to, for example, factors other than the machining conditions. For example, due to a variation in the size of a material to be machined and the like may cause a variation among machining results even when the same machining conditions are set. For this reason, unfortunately, there is a possibility that a machining result having an evaluation value equal to or greater than a desired evaluation value cannot be obtained from practical machining even when a machining condition providing a high evaluation value selected through the method described in Japanese Patent Application Laid-open No. 2008-036812 is set on a machining apparatus.

The disclosure has been made in view of the above, and an object thereof is to obtain a machining condition search device capable of obtaining a machining condition which exhibits a high degree of possibility of obtaining a machining result having an evaluation value equal to or greater than a desired evaluation value.

SUMMARY OF THE INVENTION

In order to solve the above-described problem and achieve the object, a machining condition search device according to the disclosure comprising a machining condition generation unit to generate a machining condition defined by one or more control parameters settable on a machining apparatus, and a practical machining command unit to cause the machining apparatus to perform machining based on a machining condition generated by the machining condition generation unit. The machining condition search device further comprises a machining evaluation unit to generate an evaluation value of performed machining, on a basis of information indicating a machining result of the performed machining, and a prediction unit to predict an evaluation value corresponding to a machining condition under which machining is not performed, on a basis of the evaluation value and the machining condition corresponding to the evaluation value. The machining condition search device further comprises an optimum machining condition calculation unit to obtain an optimum machining condition on a basis of a prediction value predicted by the prediction unit and an evaluation value generated by the machining evaluation unit, the optimum machining condition being a machining condition under which an evaluation value is equal to or greater than a threshold and a tolerance is maximum. The evaluation value indicates that the larger the value, the better the machining result.

BRIEF DESCRIPTION OF THE DRAWINGS

FIG. 6 is a diagram illustrating an example display of machining conditions and evaluation values of the embodiment.

DETAILED DESCRIPTION OF THE PREFERRED EMBODIMENTS

A machining condition search device and a machining condition search method according to an embodiment of the disclosure will be hereinafter described in detail with reference to the drawings. The disclosure is not limited to the embodiment.

EMBODIMENT

Figure 1:
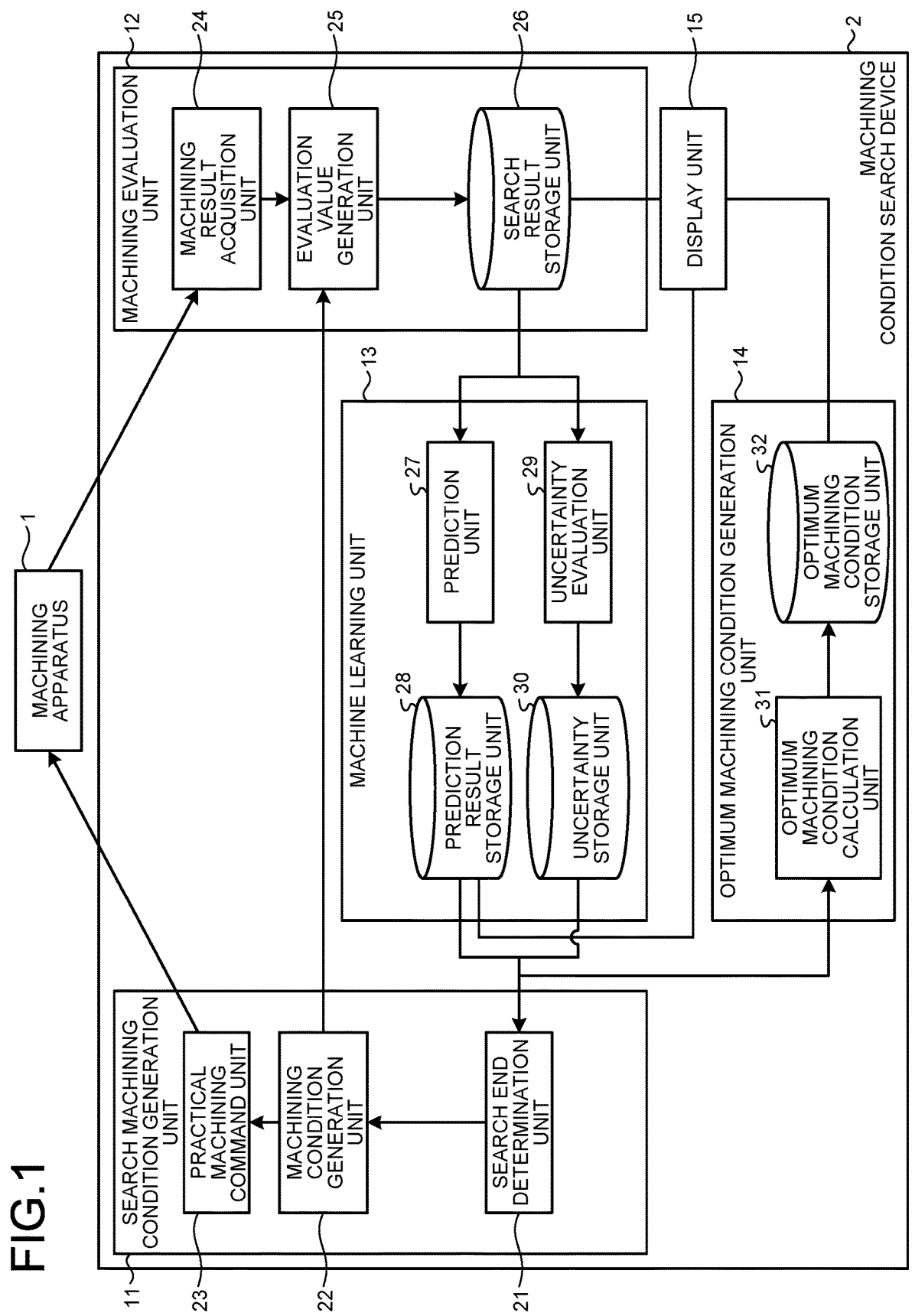
FIG. 1 is a diagram illustrating an example configuration of a machining condition search device according to an embodiment.

FIG. 1 is a diagram illustrating an example configuration of a machining condition search device according to an embodiment. A machining condition search device 2 of the present embodiment searches for a machining condition suitable for machining by a machining apparatus 1. As illustrated in FIG. 1, the machining condition search device 2 of the present embodiment includes a search machining condition generation unit 11, a machining evaluation unit 12, a machine learning unit 13, an optimum machining condition generation unit 14, and a display unit 15.

The machining apparatus 1 is, for example, an industrial machine that fabricates a machining target, i.e., a workpiece into a desired shape by removing an unnecessary portion of the workpiece. Alternatively, the machining apparatus 1 is an industrial machine that performs, for example, additive manufacturing. Such a machining target is hereinafter referred to as a "work". An example of a material of the work is metal, but the material of the work is not limited to metal, and may be ceramic, glass, wood, or the like. Such a machining apparatus 1 is, for example, a laser machining apparatus, an electrical discharge machining apparatus, a cutting apparatus, a grinding apparatus, an electrochemical machining apparatus, an ultrasonic machining apparatus, an electron beam machining apparatus, or an additive manufacturing apparatus. In the present embodiment, a description will be given assuming that the machining apparatus 1 is a laser machining apparatus, but the disclosure can also be applied to apparatuses other than the laser machining apparatus.

In a case where the machining apparatus 1 is a laser machining apparatus, the machining apparatus 1 cuts a work as follows, for example. The machining apparatus 1, which is a laser machining apparatus, includes a laser oscillator and a machining head. The laser oscillator oscillates and emits a laser beam. The laser beam emitted from the laser oscillator is supplied to the machining head via an optical path. A machining gas is supplied into the machining head, and the machining gas is supplied to the work when the work is irradiated with the laser beam. The machining head includes a condenser lens that condenses the laser beam on the work. The machining head cuts the work by condensing the laser beam and irradiating the work with the laser beam. In this manner, the work is cut by the machining apparatus 1.

The machining apparatus 1 can perform normal machining for forming the work into a desired shape, and, as will be described later, can perform experimental machining on the work. The search machining condition generation unit 11 generates a machining condition for the purpose of a search as will be described later, and the machining apparatus 1 of the present embodiment performs preset experimental machining on the work in accordance with that generated machining condition. The machining apparatus 1 includes, for example, a sensor capable of acquiring information indicating a machining result. The information indicating a machining result is, for example, information indicating a state of the machining apparatus 1 or the work during machining and information indicating a state of the work after machining. These pieces of information are acquired by, for example, a sensor of the machining apparatus 1. An example of the sensor is a sensor that detects, for example, sound or light generated during machining. Another example of the sensor is an imaging device that acquires an image obtained by imaging the work after machining, and a measuring instrument that measures unevenness of a cut surface of the work. The machining apparatus 1 can include any sensor capable of detecting information indicating a machining result, and the sensor is not limited to the above examples. Although an example in which the machining apparatus 1 includes a sensor will be described here, a sensor can be provided separately from the machining apparatus 1, and the machining condition search device 2 can acquire a detection result from this separately provided sensor.

The search machining condition generation unit 11 of the machining condition search device 2 generates a machining condition that is to be used in experimental practical machining, and causes the machining apparatus 1 to perform machining based on the generated machining condition. That is, the search machining condition generation unit 11 generates a machining condition that is to be searched for through practical machining in a multidimensional space including, as dimensions, control parameters that define a machining condition. The machining condition includes a plurality of control parameters that are adjustable in connection with machining performed by the machining apparatus 1. The control parameters are, for example, laser output, cutting speed, beam magnification, focal position, and gas pressure. As illustrated in FIG. 1, the search machining condition generation unit 11 includes a search end determination unit 21, a machining condition generation unit 22, and a practical machining command unit 23.

The machining condition generation unit 22 generates a machining condition defined by one or more control parameters settable on a machining apparatus. Specifically, the machining condition generation unit 22 generates a machining condition that is to be used in experimental machining. The machining condition generation unit 22 then outputs the generated machining condition to the practical machining command unit 23. The practical machining command unit 23 causes the machining apparatus 1 to perform machining based on the machining condition generated by the machining condition generation unit 22. Specifically, the practical machining command unit 23 generates a command for operating the machining apparatus 1, on the basis of the machining condition input from the machining condition generation unit 22, and outputs the generated command to the machining apparatus 1. The search end determination unit 21 determines whether to end the experimental machining, on the basis of information used for end determination, and outputs a determination result to the machining condition generation unit 22. The information used for end determination is generated by the machine learning unit 13, as will be described later. In the present embodiment, the machining condition search device 2 functions as a control device that outputs a command to the machining apparatus 1, generates a machining command based on the machining condition, and outputs the generated machining command to the machining apparatus 1. The type of machining condition search device is not limited to this example, and the machining condition search device 2 can be provided separately from the control device that outputs the command to the machining apparatus 1. In a case where the machining condition search device 2 is provided separately from the control device that outputs the command to the machining apparatus 1, the machining condition search device 2 does not need to include the practical machining command unit 23. In that case, the machining condition search device 2 is connected to the control device described above, and the search machining condition generation unit 11 outputs the generated machining condition to the control device described above.

The machining evaluation unit 12 generates an evaluation value of performed machining on the basis of information indicating a machining result that is a result of the performed machining. Specifically, the machining evaluation unit 12 acquires the information indicating the machining result from the machining apparatus 1, obtains an evaluation value indicating the quality of machining, using the acquired information, and stores a search result that is a combination of a machining condition and an evaluation value corresponding thereto. The machining evaluation unit 12 includes a machining result acquisition unit 24, an evaluation value generation unit 25, and a search result storage unit 26.

The machining result acquisition unit 24 acquires the information indicating a machining result from the machining apparatus 1. On the basis of the information acquired by the machining result acquisition unit 24, the evaluation value generation unit 25 obtains, for each machining condition, an evaluation value for machining performed on the basis of the machining condition. The evaluation value is, for example, a value from 0 to 1, and is defined as a value indicating that the larger the value, the better the processing result. Thus, the evaluation value is 1 when the best machining is performed, and the evaluation value is 0 when the worst machining is performed. Good machining varies depending on, for example, the type of the machining apparatus 1, and specifications required of an object obtained through machining by the machining apparatus 1. For example, when cutting is performed by a laser machining apparatus, good machining means that there is no or less occurrence of machining defects such as scratches, roughening, oxide film peeling, and dross on a cut surface. The dross is a phenomenon in which molten metal etc. adheres to a lower surface of a workpiece. The roughening means that the cut surface has poor surface accuracy. The evaluation value may be calculated by the evaluation value generation unit 25 on the basis of the information acquired by the machining result acquisition unit 24, or may be determined on the basis of a user's input. In the latter case, for example, the evaluation value generation unit 25 presents the information acquired by the machining result acquisition unit 24, to the user by displaying that information on, for example, a display means (not illustrated), and acquires, from an input means (not illustrated), the evaluation value which the user inputs using that input means. Details of the operation of the evaluation value generation unit 25 will be described later.

In addition, the evaluation value generation unit 25 stores, in the search result storage unit 26, a search result that is the combination of the machining condition and the evaluation value. The search result storage unit 26 stores the search result.

Using search results stored in the search result storage unit 26, the machine learning unit 13 predicts an evaluation value of machining corresponding to a machining condition that has not been searched for. Furthermore, the machine learning unit 13 calculates the uncertainty on a prediction value of the evaluation value. That is, the machine learning unit 13 calculates the likelihood of wrong prediction.

The machine learning unit 13 includes a prediction unit 27, a prediction result storage unit 28, an uncertainty evaluation unit 29, and an uncertainty storage unit 30. On the basis of an evaluation value generated by the evaluation value generation unit 25 and a machining condition corresponding to the evaluation value, the prediction unit 27 predicts an evaluation value corresponding to a machining condition under which machining is not performed. Specifically, using the search results stored in the search result storage unit 26, the prediction unit 27 predicts an evaluation value of machining corresponding to an unsearched machining condition, i.e., machining condition that has not been searched for. The prediction unit 27 stores, in the prediction result storage unit 28, a prediction value of the evaluation value obtained as a result of the prediction, in association with the machining condition. The prediction result storage unit 28 stores a prediction result that is a combination of the unsearched machining condition and the prediction value of the evaluation value corresponding thereto. The uncertainty evaluation unit 29 calculates an index indicating the uncertainty of the prediction by the prediction unit 27. Specifically, using the search results stored in the search result storage unit 26, the uncertainty evaluation unit 29 calculates an index indicating uncertainty on the prediction value of the evaluation value, that is, calculates the likelihood of wrong prediction. The uncertainty evaluation unit 29 stores, in the uncertainty storage unit 30, uncertainty information that is the calculated index, in association with a machining condition. Details of the operations of the prediction unit 27 and the uncertainty evaluation unit 29 will be described later.

On the basis of the prediction value predicted by the prediction unit 27 and the evaluation value generated by the machining evaluation unit 12, the optimum machining condition generation unit 14 obtains an optimum machining condition. The optimum machining condition is a machining condition under which an evaluation value is equal to or greater than a threshold and a tolerance is maximum. The tolerance will be described later. Specifically, on the basis of the prediction results stored in the prediction result storage unit 28 and the uncertainty information stored in the uncertainty storage unit 30, the optimum machining condition generation unit 14 generates an optimum machining condition that is a condition suitable for machining by the machining apparatus 1.

The optimum machining condition generation unit 14 includes an optimum machining condition calculation unit 31 and an optimum machining condition storage unit 32. On the basis of the prediction results stored in the prediction result storage unit 28 and the uncertainty information stored in the uncertainty storage unit 30, the optimum machining condition calculation unit 31 generates an optimum machining condition that is a condition suitable for machining by the machining apparatus 1. The optimum machining condition calculation unit 31 stores the generated optimum machining condition in the optimum machining condition storage unit 32. Details of the operation of the optimum machining condition calculation unit 31 will be described later. The optimum machining condition storage unit 32 stores the optimum machining condition.

The display unit 15 reads and displays information stored in each storage unit in accordance with a request from the user. For example, the display unit 15 displays the evaluation value generated by the machining evaluation unit 12 and a machining condition corresponding thereto in association with each other, displays the prediction value generated by the prediction unit 27 and a machining condition corresponding thereto in association with each other, and displays the optimum machining condition.

Next, a hardware configuration of the machining condition search device 2 will be described. Each of the search machining condition generation unit 11, the machining evaluation unit 12, the machine learning unit 13, and the optimum machining condition generation unit 14 illustrated in FIG. 1 is implemented by processing circuitry. The processing circuitry may be dedicated hardware, or circuitry including a processor. The display unit 15 is implemented by a display means such as a display or a monitor, processing circuitry that causes the display means to display display data, and an input means such as a keyboard or a mouse.

Figure 2:
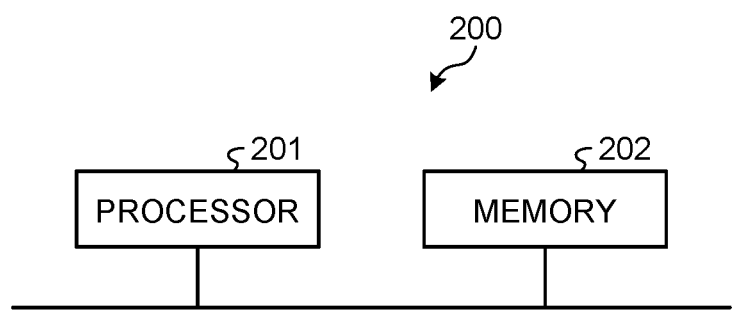
FIG. 2 is a diagram illustrating an example configuration of a processing circuitry of the embodiment.

In a case where the processing circuitry is the circuitry including a processor, the processing circuitry is, for example, processing circuitry having a configuration illustrated in FIG. 2. FIG. 2 is a diagram illustrating an example configuration of processing circuitry of the present embodiment. Processing circuitry 200 includes a processor 201 and a memory 202. In a case where each component of the machining condition search device 2 is implemented by the processing circuitry 200 illustrated in FIG. 2, the processor 201 reads and executes a program stored in the memory 202, thereby implementing functions of the search end determination unit 21, the machining condition generation unit 22, the practical machining command unit 23, the machining result acquisition unit 24, the evaluation value generation unit 25, the prediction unit 27, the uncertainty evaluation unit 29, and the optimum machining condition calculation unit 31. That is, in a case where each component of the machining condition search device 2 is implemented by the processing circuitry 200 illustrated in FIG. 2, functions thereof are implemented using a program that is software. The search result storage unit 26, the prediction result storage unit 28, the uncertainty storage unit 30, and the optimum machining condition storage unit 32 are each implemented by the memory 202. The memory 202 is also used as a work area for the processor 201. The processor 201 is a central processing unit (CPU) or the like. The memory 202 corresponds to, for example, a nonvolatile or volatile semiconductor memory such as a random access memory (RAM), a read only memory (ROM), or a flash memory, or a magnetic disk, or the like.

In a case where the processing circuitry that implements each of the search machining condition generation unit 11, the machining evaluation unit 12, the machine learning unit 13, and the optimum machining condition generation unit 14 of the machining condition search device 2 is dedicated hardware, the processing circuitry is, for example, a field programmable gate array (FPGA), or an application specific integrated circuit (ASIC). Each component of the machining condition search device 2 may be implemented by a combination of processing circuitry including a processor and dedicated hardware. Each component of the machining condition search device 2 may be implemented by a plurality of processing circuits.

Figure 3:
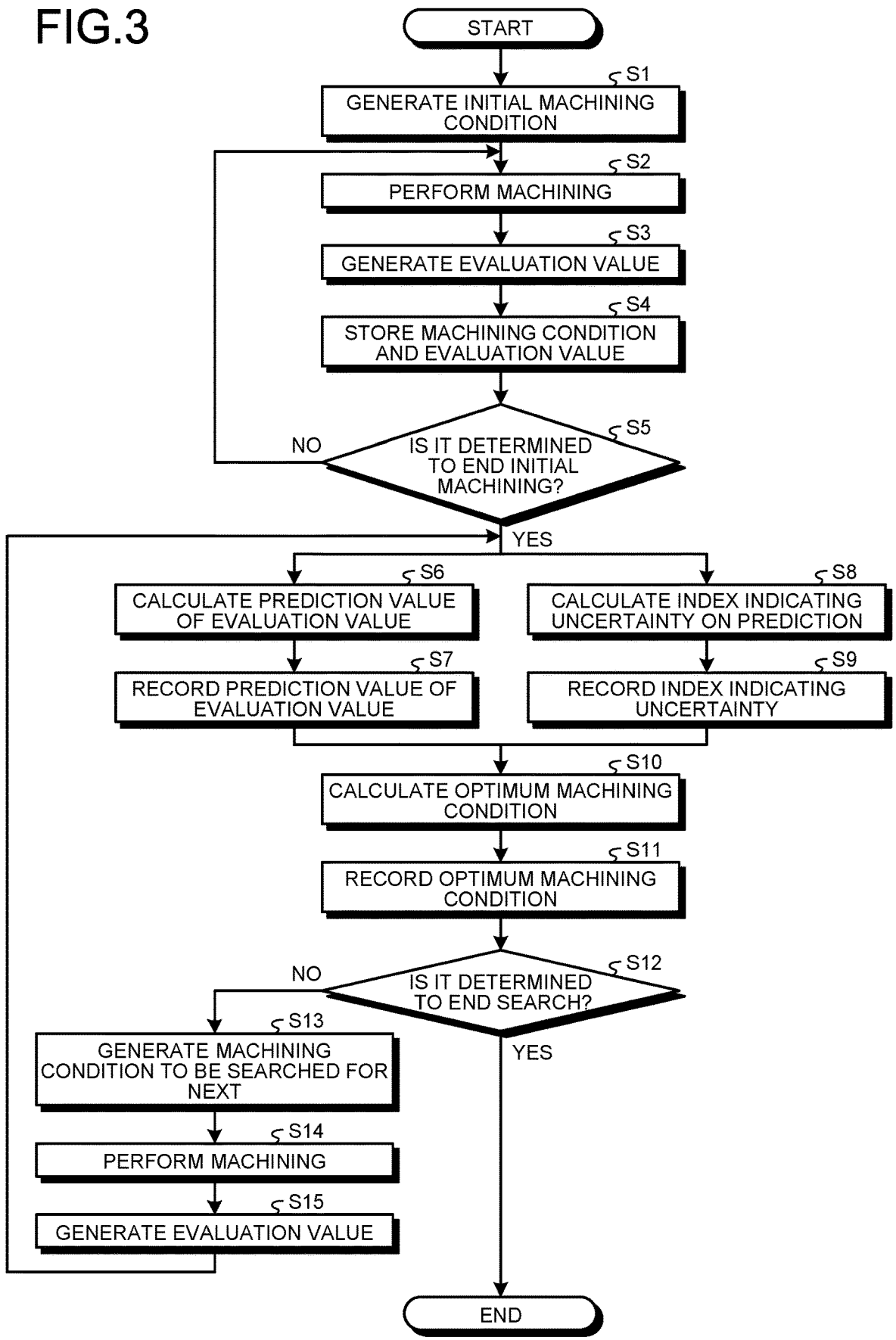
FIG. 3 is a flowchart illustrating an example of a machining condition search processing procedure performed by the machining condition search device of the embodiment.

Next, an operation of the present embodiment will be described. FIG. 3 is a flowchart illustrating an example of a machining condition search processing procedure performed by the machining condition search device 2 of the present embodiment. When a machining condition search process starts, first, the machining condition generation unit 22 generates initial machining conditions (step S1). The machining condition generation unit 22 generates the initial machining conditions by selecting a predetermined number of machining conditions from all combinations of settable machining conditions. The selected predetermined number of machining conditions is defined as the initial machining conditions. As a method for selecting the initial machining conditions, any method may be used, and examples thereof include experimental design, optimum design, and random sampling. In a case where there are machining conditions which a user considers optimum in view of past use results or the like, the machining conditions input by the user may be used as the initial machining conditions.

For example, assuming that each machining condition is defined by five control parameters, and a value to be set on the machining apparatus 1 is selected from values of eleven levels, on a control-parameter-by-control-parameter basis, the total number of machining conditions is 161051. From among these machining conditions, ten different machining conditions are selected as initial machining conditions. The number of control parameters defining each machining condition, the number of levels settable for each control parameter, and the number of machining conditions to be selected as the initial machining conditions are not limited thereto. The different number of levels may be set depending on the control parameter.

Next, the machining condition search device 2 selects one initial machining condition from among the generated initial machining conditions, and causes the machining apparatus 1 to perform machining under the selected initial machining condition (step S2). Specifically, the machining condition generation unit 22 selects one of the initial machining conditions, and outputs the selected initial machining condition to the practical machining command unit 23 and the evaluation value generation unit 25. The practical machining command unit 23 generates a command for operating the machining apparatus 1, on the basis of the initial machining condition input from the machining condition generation unit 22, and outputs the generated command to the machining apparatus 1. As a result, the machining apparatus 1 performs machining based on the initial machining condition selected by the machining condition generation unit 22. As described above, the machining condition search device 2 of the present embodiment first causes the machining apparatus 1 to perform machining based on the initial machining condition. The machining based on the initial machining condition is hereinafter also referred to as initial machining.

Next, the machining condition search device 2 generates an evaluation value corresponding to the machining performed in step S2 (step S3). Specifically, the machining result acquisition unit 24 acquires information indicating a machining result corresponding to the machining performed in step S2 and outputs the information to the evaluation value generation unit 25. Using the information indicating the machining result, the evaluation value generation unit 25 obtains an evaluation value indicating the quality of the machining performed in step S2.

As described above, the evaluation value is, for example, a value from 0 to 1. The evaluation value may be a continuous value or a discrete value, for example, a value rated on a 10-point scale. For example, the evaluation value generation unit 25 performs image processing on an image of a cut surface of the work, thereby calculating the amounts of occurred machining defects such as dross, oxide film peeling, roughening, and scratches. The evaluation value generation unit 25 then calculates an evaluation value indicating the quality of machining depending on the calculated amounts. A method for calculating the amounts of dross, oxide film peeling, roughening, and scratches may be any method. For example, the evaluation value generation unit 25 obtains, from a difference in brightness of pixels, a region where these machining defects occur, and quantitatively obtains the amounts of occurred machining defects depending on, for example, the length, or area, of the region. Then, a correspondence between an evaluation value and the amounts of occurred machining defects is determined such that the larger the amounts of the occurred processing defects, the smaller the evaluation value, and the evaluation value generation unit 25 calculates the evaluation value on the basis of the correspondence. As described above, the user can input the evaluation value. The evaluation value may be determined depending on sound or light generated during machining. For example, the evaluation value may be defined such that the higher the level of sound generated during machining, the smaller the evaluation value. The evaluation value generation unit 25 may calculate the evaluation value by combining a plurality of types of information.

Next, the machining condition search device 2 stores the machining condition and the evaluation value (step S4). Specifically, the machining result acquisition unit 24 stores, in the search result storage unit 26, the machining condition received from the machining condition generation unit 22 and the evaluation value calculated in step S3, in association with each other. The machining condition and the evaluation value, which are thus stored in association with each other in the search result storage unit 26, are defined as a search result.

Next, the machining condition search device 2 determines whether to end the initial machining (step S5), and if it is determined to end the initial machining (step S5: Yes), the machining condition search device 2 performs the processes of steps S6 and S8 described later. In step S5, specifically, the machining condition search device 2 determines whether pieces of processing corresponding to all the initial machining conditions generated in step S1 have been performed. If it is determined that pieces of processing corresponding to all the initial machining conditions generated in step S1 have been performed, the machining condition search device 2 determines to end the initial machining.

If it is determined not to end the initial processing (step S5: No), the machining condition search device 2 repeats the processes from step S2 onward. In a process of step S2 performed for the second and subsequent times, the machining condition search device 2 selects an initial machining condition that has not been selected in step S2. The example described above is where the machining condition search device 2 repeats an operation of causing the machining apparatus 1 to perform machining corresponding to one of the initial machining conditions to obtain and store an evaluation value. Such an example is not exhaustive, and the machining condition search device 2 can cause the machining apparatus 1 to perform machining corresponding to all the generated initial machining conditions, acquire information indicating machining results corresponding to the thus performed machining from the machining apparatus 1, and obtain and store an evaluation value for each initial machining condition.

In step S6, using the search results stored in the search result storage unit 26, the prediction unit 27 calculates a prediction value of an evaluation value corresponding to an unsearched machining condition that is a machining condition under which machining has not been performed yet. For a machining condition under which machining has been performed, the evaluation value is generated in step S3 described above. The machining condition under which machining has been performed is part of all machining conditions. For example, in a case where there are 161041 machining conditions in total and the ten different initial machining conditions among these machining conditions are generated, there are 161031 unsearched machining conditions after the initial machining is ended. In that case, thus, the prediction unit 27 calculates 161031 prediction values of the evaluation values. As described later, steps S13 to S15 provide processes of selecting a machining condition, performing machining, and calculating an evaluation value, and step S6 is performed after step S15. In a case where step S6 is performed via steps S13 to S15, the machining condition set in step S13 is excluded from the unsearched machining conditions.

The prediction unit 27 uses some method for calculating a prediction value of an evaluation value corresponding to an unsearched machining condition. One example of such a method for predicting an evaluation value corresponding to an unsearched machining condition is a method using Gaussian process regression. In a case where the prediction unit 27 uses Gaussian process regression to predict an evaluation value corresponding to an unsearched machining condition, the following calculation is performed. The method using Gaussian process regression is an example of a method using a probabilistic model of an evaluation value for a machining condition, the probabilistic model being generated on the assumption that the evaluation value for a machining condition is a random variable following a specific distribution. Assume that the number of observation values, that is, the number of machining conditions under which machining is performed and for which evaluation values are calculated is denoted by N, a gram matrix is denoted by $C_N$, and a vector of arranged machining conditions recorded in the search result storage unit 26 is denoted by t. Also, assume that one of the control parameters that define each machining condition is denoted by $x_i$ (i is a natural number) and values of the control parameters in individual machining conditions recorded in the search result storage unit 26 are denoted by $x_1$ to $x_N$. On this assumption, a prediction value $m(x_{N+1})$ of an evaluation value for an unsearched machining condition $x_{N+1}$ can be calculated by formula (1) below. As indicated in formula (2) below, k is a vector of arranged values of the kernel function when each of the searched machining conditions $x_1, \ldots,$ and $x_N$, and $x_{N+1}$ are used as arguments. Note that a superscript T represents transposition, and a superscript −1 represents an inverse matrix.

[Formula 1]

$$m(x_{N+1}) = k^T \cdot (C_N^{-1}) \cdot t \quad (1)$$

$$k = \begin{pmatrix} \text{kernel}(x_1, x_{N+1}) \\ \vdots \\ \text{kernel}(x_N, x_{N+1}) \end{pmatrix} \quad (2)$$

The above-described example is where the prediction unit 27 performs prediction using Gaussian process regression, but a method for predicting an evaluation value is not limited thereto, and may be, for example, a method using supervised machine learning such as a decision tree, linear regression, boosting, or a neural network.

Next, the machining condition search device 2 records the prediction value of the evaluation value (step S7). Specifically, the prediction unit 27 stores, in the prediction result storage unit 28, the prediction value of the evaluation value calculated in step S6 in association with the machining condition. The prediction value and the machining condition, which are thus stored in the prediction result storage unit 28 in association with each other, are defined as a prediction result.

Using the search results stored in the search result storage unit 26, the uncertainty evaluation unit 29 calculates an index indicating the uncertainty on prediction of an evaluation value corresponding to an unsearched machining condition (step S8). An example of the index indicating the uncertainty is a standard deviation calculated using Gaussian process regression that is an example of a probabilistic model. In a case where the uncertainty evaluation unit 29 calculates the index indicating the uncertainty by using Gaussian process regression, for example, the following calculation is performed. Assume that the number of observation values, that is, the number of machining conditions under which machining is performed and for which evaluation values are calculated is denoted by N, the gram matrix is denoted by $C_N$, the vector of arranged machining conditions recorded in the search result storage unit 26 is denoted by k, and a scalar value obtained by adding an accuracy parameter of a prediction model to a value of kernel for the unsearched machining conditions $x_{N+1}$ is denoted by c. Also, assume that one of the control parameters that define each machining condition is denoted by $x_i$ (i is a natural number) and values of the control parameters in individual machining conditions recorded in the search result storage unit 26 are denoted by $x_1$ to $x_N$, a standard deviation $\sigma(x_{N+1})$ that is an index indicating the uncertainty on prediction of the evaluation value for the unsearched machining condition $x_{N+1}$ can be calculated by formula (3) below. Although a variance $\sigma^2(x_{N+1})$ is obtained with formula (3), the standard deviation $\sigma(x_{N+1})$ can be obtained by calculating the square root of the variance.

$$\sigma^2(x_{N+1}) = c - k^T \cdot (C_N^{-1}) \cdot k \quad (3)$$

The above-described example is where the uncertainty evaluation unit 29 calculates the index indicating the uncertainty on prediction using Gaussian process regression, but the method for calculating the index indicating the uncertainty is not limited to this example, and for example, a method such as density estimation or a mixture density network may be used.

Figure 4:
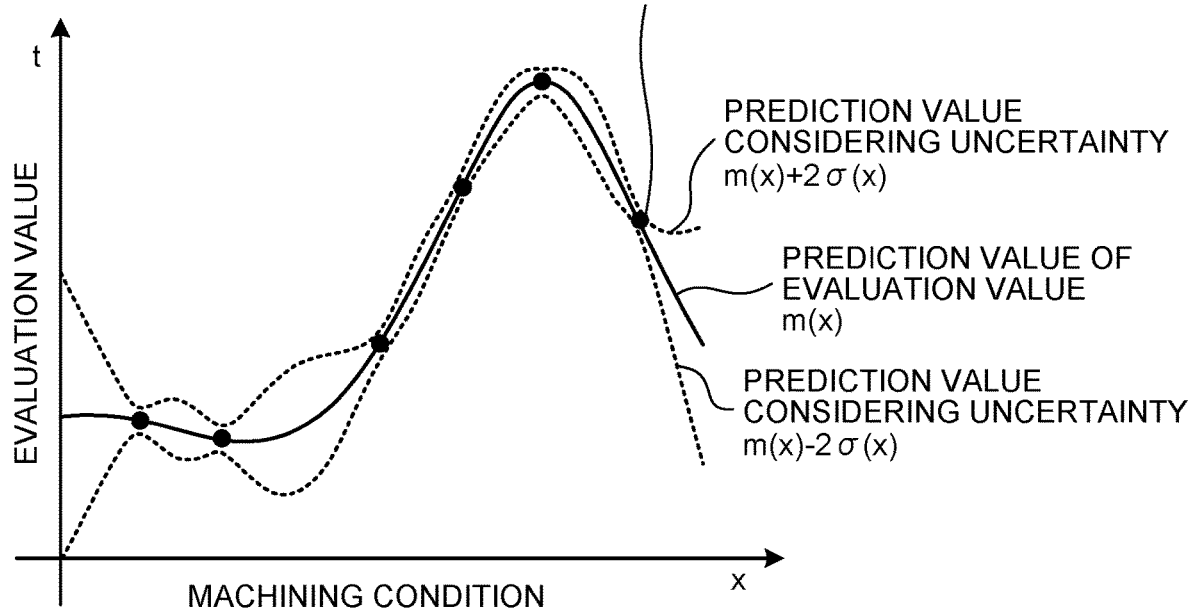
FIG. 4 is an explanatory diagram conceptually illustrating a prediction value of an evaluation value and an index indicating uncertainty in the embodiment.

Description will be made as to a prediction value of an evaluation value and the uncertainty of the prediction value in the present embodiment. FIG. 4 is an explanatory diagram conceptually illustrating a prediction value of an evaluation value and an index indicating uncertainty in the present embodiment. FIG. 4 illustrates an example in which the prediction value and the index indicating the uncertainty are calculated using Gaussian process regression. The horizontal axis in FIG. 4 represents a value x of a control parameter that is a machining condition, and the vertical axis in FIG. 4 represents an evaluation value. Points indicated by solid circles in FIG. 4 represent evaluation values calculated on the basis of practical machining that uses the initial machining conditions (these calculated evaluation values are also hereinafter referred to as evaluation values of practical machining). For the prediction using Gaussian process regression, an evaluation value is predicted assuming that the evaluation value follows a Gaussian distribution. Assuming that the prediction value of the evaluation value is indicated as an average m(x) of the Gaussian distribution and the index indicating the uncertainty of prediction is indicated as a standard deviation σ(x) of the Gaussian distribution, thus, it is statistically indicated that the probability that practical evaluation value falls within a range of m(x)−2σ(x) or more and m(x)+2σ(x) or less is about 95%. In FIG. 4, a curve indicated by a solid line represents m(x) that is the prediction value of the evaluation value, and curves indicated by broken lines represent curves of m(x)−2σ(x) and m(x)+2σ(x). As illustrated in FIG. 4, the index indicating the uncertainty decreases at positions close to the evaluation values of the practical machining, and the index indicating the uncertainty increases at positions remote from the evaluation values of the practical machining.

Returning to the description of FIG. 3, after step S8, the machining condition search device 2 records the index indicating the uncertainty of the prediction value (step S9). Specifically, the uncertainty evaluation unit 29 stores, in the uncertainty storage unit 30, the index indicating the uncertainty of the prediction value calculated in step S8, in association with the machining condition.

After steps S7 and S9, the machining condition search device 2 calculates an optimum machining condition (step S10). Specifically, using the search results stored in the search result storage unit 26 and the prediction results stored in the prediction result storage unit 28, the optimum machining condition calculation unit 31 calculates a machining condition under which an evaluation value is equal to or greater than a threshold and a tolerance, i.e, robustness is maximum. In a case where the evaluation value takes a value from 0 to 1, the threshold can be set to 1, which is a value indicating that highest quality machining has been performed. Alternatively, the threshold may be set to a value close to 1 and smaller than 1, such as 0.85.

In the present embodiment, the tolerance indicates the degree of possibility that an evaluation value similar to an evaluation value associated with some selected machining condition is obtained when machining is performed under that selected machining condition even if there is a variation among evaluation values obtained through machining performed by the machining apparatus 1 using the same machining condition. The evaluation value associated with the selected machining condition includes an evaluation value obtained through practical machining and a prediction value of the evaluation value, and these evaluation values are also hereinafter referred to as expected evaluation values. In the present embodiment, as described later, a machining condition is selected on the basis of the expected evaluation values, such that the expected evaluation values selected are equal to or greater than desired values. However, an evaluation value obtained through practical machining performed on the basis of the thus selected machining condition may be different from the expected evaluation values because of some factors. The present embodiment defines the tolerance as the degree of possibility that the expected evaluation values match the evaluation value obtained through practical machining performed on the basis of the selected machining condition. The present embodiment selects a machining condition having high tolerance, thereby enhancing the possibility of performing machining that provides a desired evaluation value even if there is a variation among evaluation values obtained through machining performed by the machining apparatus 1 using the same machining condition. An example of the tolerance is a value that indicates how far a point corresponding to some machining condition that provides an evaluation value equal to or greater than a threshold is away from a boundary between a region where the evaluation value is equal to or greater than the threshold and a region where the evaluation value is less than the threshold, in a multidimensional space including, as dimensions, parameter values of a plurality of control parameters that define each machining condition. In that case, for example, a machining condition at the center of the region where the evaluation value is equal to or greater than the threshold can be defined as a machining condition having the highest tolerance.

Figure 5:
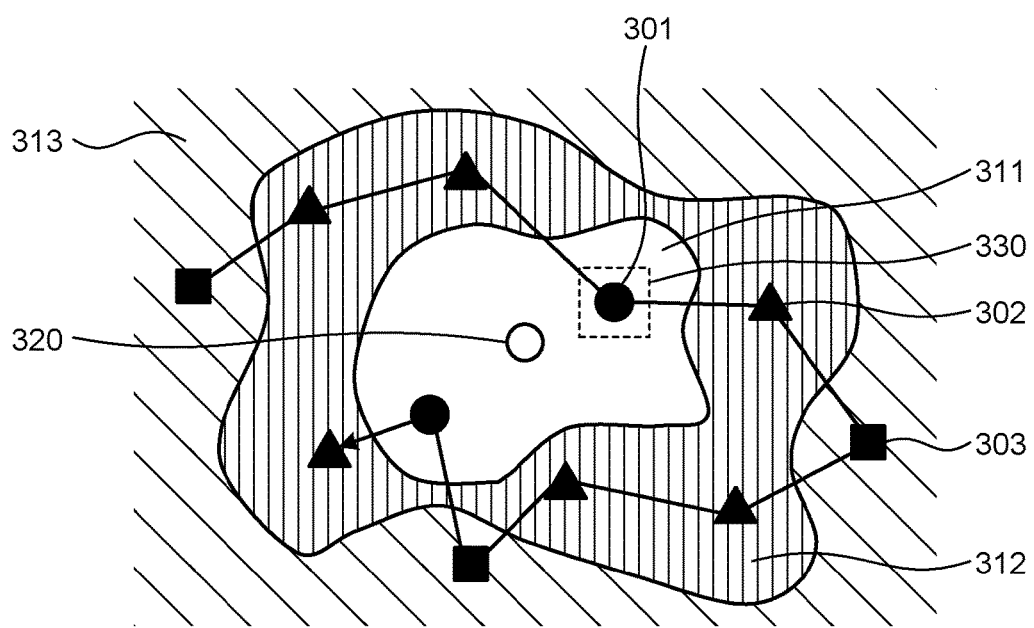
FIG. 5 is a diagram for explaining tolerance of the embodiment.

FIG. 5 is a diagram for describing tolerance of the present embodiment. FIG. 5 illustrates a plane in which the horizontal axis and the vertical axis represent parameter values of each of a first control parameter and a second control parameter when these two control parameters, i.e., the first control parameter and the second control parameter define a machining condition. In FIG. 5, points indicated by circles, triangles, and squares represent points corresponding to machining conditions under which practical machining has been performed. A machining condition 301 indicated by a circle represents a machining condition under which the evaluation value is 0.85 or more. A machining condition 302 indicated by a triangle represents a machining condition under which the evaluation value is 0.45 or more and less than 0.85. A machining condition 303 indicated by a square represents a machining condition under which the evaluation value is less than 0.45. The evaluation value corresponding to a point where practical machining has been performed is an evaluation value calculated through practical machining, and the evaluation value at a point corresponding to an unsearched machining condition is the above-described prediction value.

Assume that, for example, the evaluation value is 0.85 or more is defined as good machining, the evaluation value is 0.45 or more and less than 0.85 is defined as slightly defective machining, and the evaluation value is less than 0.45 is defined as severely defective machining. In FIG. 5, a region 311 is a region where the evaluation value is 0.85 or more, a region 312 is a region where the evaluation value is 0.45 or more and less than 0.85, and a region 313 is a region where the evaluation value is less than 0.45. In a case where it is desired to set a machining condition that achieves good machining as the above-described threshold is 0.85, a boundary between a region where the evaluation value is equal to or greater than the threshold and a region where the evaluation value is less than the threshold is a boundary between the region 311 and the region 312. In that case, the farther away from the boundary between region 311 and region 312, the higher the tolerance. For example, therefore, center 320 that is the centroid of the region 311 is a machining condition having the highest tolerance. In that case, the optimum machining condition calculation unit 31 obtains, as an optimum machining condition, a machining condition corresponding to the centroid of the region where the evaluation value is equal to or greater than the threshold in a multidimensional space including, as dimensions, the plurality of control parameters that define each machining condition.

The method for calculating the machining condition having the highest tolerance is not limited to the above-described example. For example, weights are assigned in accordance with evaluation values, and a machining condition corresponding to a point on coordinates having a weighted average is defined as a machining condition having the highest tolerance. Reference is made to FIG. 5, for example. Assuming that $w_1$ represents a weight for the evaluation value of 0.85 or more, $w_2$ represents a weight for the evaluation value of 0.45 or more and less than 0.85, and the threshold is 0.45 or more, $w_1+w_2=1$ holds true. In that case, coordinates $p_L$ having the highest tolerance can be obtained by formula (4) below in which $p_1$ represents the coordinates of the centroid of the region 311, and $p_2$ represents the coordinates of the centroid of the region 312.

$$p_L = w_1 \times p_1 + w_2 \times p_2 \qquad (4)$$

The method for calculating the weighted average is not limited to the above-described example. As described above, the prediction values are calculated for all the unsearched machining conditions, and the above-described region is calculated using results of the calculations. In fact, thus, the prediction values of the evaluation values are calculated for discretely arranged points rather than the continuous boundary being calculated as illustrated in FIG. 5. In the case of calculation of, for example, the coordinates of the centroid of the region 311, therefore, the centroid of individual coordinate values of the points discretely arranged in the region 311 is calculated. The same applies to the weighted average. This means that a large number of combinations of the machining conditions increases the amount of calculation in obtaining a center point that is the centroid or the weighted average. In order to reduce the amount of calculation, therefore, the center point or the weighted average described above may be calculated after the machining conditions to be considered are thinned out.

Since the present embodiment selects, for example, the center 320, which is the centroid of the region 311, as the optimum machining condition having the highest tolerance, as described above, the optimum machining condition is away from the boundary of the region 311. In contrast, the region 330 would be searched, for example, when a point having the highest evaluation value is obtained as a result of a search through practical machining and a search around that point is performed through practical machining, as in Japanese Patent Application Laid-open No. 2008-036812. If the optimum machining condition is searched for in the region 330, which is located near the upper right in the region 311 of FIG. 5, only machining conditions that can be searched are closer to the boundary of the region 311 than the optimum machining condition selected in the present embodiment. As described above, in the present embodiment, the machining condition away from the boundary of the region 311 is selected as the optimum machining condition, so that even if there is a variation among the machining results obtained under the same machining condition, the possibility of obtaining a desired machining result is enhanced.

Reference is made back to FIG. 3. After step S10, the machining condition search device 2 stores the optimum machining condition (step S11). Specifically, the optimum machining condition calculation unit 31 stores the optimum machining condition obtained in step S10 in the optimum machining condition storage unit 32.

Next, the machining condition search device 2 determines whether to end the search (step S12), and if it is determined to end the search (step S12: Yes), the process ends. Specifically, in step S12, the search end determination unit 21 determines whether a search end condition is satisfied. An example of the search end condition is a condition that an index indicating the uncertainty of evaluation value prediction for all the machining conditions is equal to or less than a threshold. The search end determination unit 21 can calculate a prediction error rate that is a probability that the prediction value is erroneous, on the basis of the index indicating the uncertainty and the prediction value, and determine, on the basis of the prediction error rate, whether to end the search for a machining condition. Another example of the search end condition is a condition that the number of machining conditions that may greatly deviate from the prediction is equal to or less than a specified number. The prediction value is calculated on the basis of a plurality of surrounding measured values. In the presence of a machining condition for which the prediction value greatly differ from the measured values, the measured value of such a machining condition affects a wide range of a search space, which results in a significant change in the prediction value. That is why the search end condition can be the condition that the number of machining conditions that may greatly deviate from the prediction is equal to or less than the specified number.

Assume that, for example, the evaluation value is from 0 to 1, and the evaluation value "1" is defined as a value indicating that the best machining has been performed. It is not preferable for the user that a predicted evaluation value and an evaluation value obtained through practical machining be greatly different from each other within the range of the evaluation value from 0 to 1. Assuming that, for example, machining providing an evaluation value of 0.85 or more is determined as good machining, the evaluation value of 0.9 obtained through practical machining under a machining condition predicted to have an evaluation value of 0.95 less influences the quality of products. On the other hand, the evaluation value of 0.2 obtained through practical machining under a machining condition predicted to have an evaluation value of 0.95 provide a great influence as a severe machining defect occurs despite the machining being performed under the high-quality machining condition. Two ranges, one including the evaluation value obtained through the practical machining, the other including the prediction value, can provide having significant influence if interchanged, like a range resulting in a severe machining defect and a range determined as providing good machining, as described above. In such a case, a prediction error rate that is a probability that such a prediction error occurs may be used for the search end determination.

For example, a machining condition under which an evaluation value falls within a first range is defined as a group #1, and a machining condition under which an evaluation value falls within a second range is defined as a group #2. The first range is, for example, a range of 0 or more and less than 0.3. The second range, which is a range not overlapping the first range, is, for example, a range of 0.7 or more and 1 or less. In that case, it is not preferable that machining performed under a machining condition predicted to belong to the group #2 practically result in an evaluation value corresponding to the group #1. In addition, it is not preferable that machining performed under a machining condition predicted to belong to the group #1 practically result in an evaluation value corresponding to the group #2. For this reason, the search end determination unit 21 calculates a first prediction error rate and a second prediction error rate, using the prediction results stored in the prediction result storage unit 28 and the indices indicating the uncertainty of prediction stored in the uncertainty storage unit 30. The first prediction error rate is a probability that a machining condition predicted to belong to the group #1 practically belongs to the group #2, and the second prediction error rate is a probability that a machining condition predicted to belong to the group #2 practically belongs to the group #1. In other words, the first prediction error rate is a probability that a practical evaluation value of a machining condition under which a prediction value is predicted to fall within the first range falls within the second range that does not overlap the first range. Using Gaussian process regression, a prediction value m(x) of an evaluation value for some machining condition x is in the range: 0≤m(x)≤0.3. That is, some machining condition x is predicted to belong to the group #1, and the standard deviation of the uncertainty on prediction is denoted by σ(x). In this case, the first prediction error rate that is a probability that the machining condition x practically belongs to the group #2 rather than to the group #1 can be calculated by formula (5) below. The second prediction error rate can be similarly calculated by changing an integration range. z is a variable for performing integration.

[Formula 2]

$$\int_{0.7}^{\infty} \frac{1}{\sqrt{2\pi\sigma(x)^2}} \exp\left(-\frac{(z-m(x))^2}{2\sigma(x)^2}\right) dz \quad (5)$$

The search end determination unit 21 may determine to end the search in a case where both the first prediction error rate and the second prediction error rate are each equal to or less than a predetermined value. Alternatively, the search end determination unit 21 can determine to end the search in a case where the first prediction error rate is equal to or less than the predetermined value. The first prediction error rate and the second prediction error rate calculated in this manner are examples of a prediction error rate indicating a probability that the prediction is erroneous. The prediction error rate only needs to be an index related to a difference between prediction and practical measurement, and is not limited to the example described above. For example, the prediction error rate can be the index indicating the uncertainty of evaluation value prediction described above. The search end determination unit 21 can use a combination of plural items in determining to end the search. For example, the search end determination unit 21 can determine to end the search in a case where the index indicating the uncertainty of evaluation value prediction is equal to or greater than the threshold and the first prediction error rate is equal to or less than the predetermined value.

If it is determined in step S12 not to end the search (step S12: No), the machining condition search device 2 generates a machining condition to be searched for next (step S13). Specifically, when the search end determination unit 21 determines that the search end condition is not satisfied, the search end determination unit 21 instructs the machining condition generation unit 22 to generate a machining condition to be searched for next. On the basis of the instruction, the machining condition generation unit 22 selects a machining condition to be searched for next, that is, a new machining condition, from among all the machining conditions. The machining condition generation unit 22 outputs that selected machining condition to the practical machining command unit 23. The search end determination unit 21 determines whether to end the search for a machining condition, on the basis of the index indicating the uncertainty, for example, and if it is determined not to end the search, the search end determination unit 21 causes the machining condition generation unit 22 to generate a new machining condition.

A selection method which the search end determination unit 21 uses in selecting a machining condition to be searched for next is, for example, a method for selecting a machining condition corresponding to an evaluation value for a machining result at a boundary between good machining and defective machining. Clarifying a region in the multidimensional space, of the machining condition corresponding to the evaluation value for the machining result at the boundary between good machining and defective machining makes it possible to determine the inside of the region as a region having a high evaluation value and the outside thereof as a region having a low evaluation value, and to obtain the center coordinates of the high-evaluation-value region through a small number of trials.

For example, assume that a machining condition under which an evaluation value is around 0.7 is selected, a prediction value of an evaluation value for the machining condition x is denoted by m(x), and a standard deviation that is an index indicating the uncertainty on prediction is denoted by σ(x). In this case, if the search end determination unit 21 selects x that maximizes a value of formula (6) below, it is possible to obtain a machining condition under which an evaluation value is close to 0.7.

$$-(m(x)-0.7)^2 + \kappa \cdot \sigma(x) \tag{6}$$

κ is a parameter for determining weighting of prediction and the uncertainty thereof. A search is made placing emphasis on prediction as κ decreases. The search is made placing emphasis on uncertainty as κ increases. A target evaluation value can remain the same value from the start to the end of the search, or can be a different value each time the search is performed. In a case where the search end determination unit 21 calculates the above-described prediction error rate, a prediction error rate can be acquired from the search end determination unit 21, and a machining condition can be selected from a range of a high prediction error rate. Alternatively, similarly to the search end determination unit 21, the machining condition generation unit 22 can obtain the prediction error rate on the basis of the prediction results stored in the prediction result storage unit 28 and the indices indicating the uncertainty of prediction stored in the uncertainty storage unit 30, and generate a machining condition on the basis of the obtained prediction error rate. For example, the machining condition generation unit 22 selects a machining condition from the range of a high prediction error rate.

After step S13, similarly to steps S2 and S3, steps S14 and S15 are performed, and after step S15, steps S6 and S8 are performed again.

The display unit 15 can display, for example, data obtained in the course of the above-described processes, and an optimum machining condition obtained as a result of the processes. For example, it is possible for the display unit 15 to display an evaluation value generated by the machining evaluation unit 12 and a machining condition corresponding thereto, in association with each other, to display a prediction value generated by the prediction unit 27 and a machining condition corresponding thereto, in association with each other, and further to display the optimum machining condition. FIG. 6 is a diagram illustrating an example display of machining conditions and evaluation values of the present embodiment. In the example illustrated in FIG. 6, one of the horizontal axis and the vertical axis represent one of the two control parameters, and the other axis represents the other control parameter. Also, evaluation values at individual points representing machining conditions are indicated by different figures. In FIG. 6, points corresponding to hatched figures each indicate a searched machining condition, and points corresponding to unhatched figures each indicate a predicted machining condition. In addition, circular figures each indicate that an evaluation value thereof corresponds to good machining, square figures each indicate that an evaluation value thereof corresponds to defective machining, and triangular figures each indicate that an evaluation value thereof corresponds to slightly defective machining. A point indicated by double circles represents an estimated optimum machining condition. The background of the points indicating the individual machining conditions in FIG. 6 includes a range of good machining indicated by vertical hatching. Such an example display of machining conditions and evaluation values is not limited to the example illustrated in FIG. 6.

The example described above is where the machining apparatus 1 is a laser machining apparatus, but, as described above, the machining apparatus 1 is not limited to the laser machining apparatus. In a case where the machining condition search method described in the present embodiment is applied to the machining apparatus 1 other than the laser machining apparatus, machining conditions defined by control parameters corresponding to the machining apparatus 1 can be similarly searched. For example, in a case where the machining apparatus 1 is a wire electrical discharge machining apparatus, discharge stop time, discharge pulse energy, average machining voltage, and the like can be used as the control parameters.

As described above, according to the present embodiment, the machining condition search device 2 includes the machining condition generation unit 22 that generates a machining condition defined by one or more control parameters settable on the machining apparatus 1, and the machining evaluation unit 12 that calculates an evaluation value indicating the quality of performed machining, on the basis of the information for evaluating the machining performed on the basis of the machining condition generated by the machining condition generation unit 22. The machining condition search device 2 further includes the prediction unit 27 that predicts, on the basis of the evaluation value calculated by the machining evaluation unit 12, an evaluation value of a machining condition under which the corresponding machining has not been performed. The machining condition search device 2 further includes the optimum machining condition calculation unit 31. Using the prediction value predicted by the prediction unit 27, the optimum machining condition calculation unit 31 calculates a machining condition under which an evaluation value is equal to or greater than a threshold and a tolerance is high. As a result, it is possible to obtain, through a small number of trials, a machining condition which exhibits a high degree of possibility of obtaining a machining result having an evaluation value equal to or greater than a desired evaluation value.

In addition, the machining condition search device 2 includes the uncertainty evaluation unit 29 that calculates an index indicating the uncertainty of prediction by the prediction unit 27. Using the index, the machining condition search device 2 determines whether the search end condition is satisfied. If it is determined not to end the search, the machining condition search device 2 newly generates an additional machining condition under which practical machining is performed, and calculates an evaluation value corresponding to machining performed on the basis of the generated machining condition. Then, the processes by the machining condition generation unit 22, the practical machining command unit 23, the prediction unit 27, the uncertainty evaluation unit 29, and the optimum machining condition calculation unit 31 are repeated until the search end condition is satisfied. As a result, it is possible to reduce the number of machining conditions under which practical machining is performed as an initial search, and to obtain an optimum machining condition by performing practical machining in a minimum times that satisfy the search end condition.

The machining condition search device according to the disclosure achieves an effect of obtaining a machining condition which exhibits a high degree of possibility of obtaining a machining result having an evaluation value equal to or greater than a desired evaluation value.

The configurations described in the embodiment above are merely examples of the content of the disclosure and can be combined with other known technology and part thereof can be omitted or modified without departing from the gist of the disclosure.

What is claimed is:

1. A machining condition search device comprising:
   machining condition generation circuitry to generate a machining condition defined by one or more control parameters settable on a machining apparatus;
   practical machining command circuitry to cause the machining apparatus to perform machining based on a machining condition generated by the machining condition generation circuitry;
   machining evaluation circuitry to generate an evaluation value of performed machining, on a basis of information indicating a machining result of the performed machining;
   prediction circuitry to predict an evaluation value corresponding to a machining condition under which machining is not performed, on a basis of the evaluation value and the machining condition corresponding to the evaluation value;
   optimum machining condition calculation circuitry to obtain an optimum machining condition on a basis of a prediction value predicted by the prediction circuitry and an evaluation value generated by the machining evaluation circuitry, the optimum machining condition being a machining condition under which an evaluation value is equal to or greater than a threshold and a tolerance is maximum;
   uncertainty evaluation circuitry to calculate an index indicating uncertainty of prediction by the prediction circuitry; and
   search end determination circuitry to determine, on a basis of the index, whether to end a search for a machining condition, and, when determining not to end the search, to cause the machining condition generation circuitry to generate a new machining condition, wherein
   the evaluation value indicates that the larger the value, the better the machining result, and
   processes by the machining condition generation circuitry, the practical machining command circuitry, the machining evaluation circuitry, the prediction circuitry, the uncertainty evaluation circuitry, and the optimum machining condition calculation circuitry are repeated until the search end determination circuitry determines to end the search.

2. The machining condition search device according to claim 1, wherein the search end determination circuitry calculates a prediction error rate that is a probability that a prediction value is erroneous, on a basis of the index and the prediction value, and determines, on a basis of the prediction error rate, whether to end the search for a machining condition.

3. The machining condition search device according to claim 2, wherein the search end determination circuitry calculates a first prediction error rate on a basis of the index and the prediction value and determines, on a basis of the first prediction error rate, whether to end the search for a machining condition, the first prediction error rate being a probability that a practical evaluation value of a machining condition under which a prediction value is predicted to fall within a first range falls within a second range that does not overlap the first range.

4. The machining condition search device according to claim 1, wherein the machining condition generation circuitry generates, on a basis of the prediction value, a machining condition under which an evaluation value for a machining condition is an intermediate value.

5. The machining condition search device according to claim 1, wherein the machining condition generation circuitry generates a machining condition, using a prediction error rate that is a probability that the prediction value is erroneous.

6. The machining condition search device according to claim 1, wherein
   the prediction circuitry generates the prediction value, using a probabilistic model of an evaluation value for the machining condition, the probabilistic model being generated on an assumption that an evaluation value for a machining condition is a random variable following a specific distribution, and
   the uncertainty evaluation circuitry calculates the index, using the probabilistic model.

7. The machining condition search device according to claim 1, wherein the optimum machining condition calculation circuitry obtains, as the optimum machining condition, a machining condition corresponding to a centroid of a region where the evaluation value is equal to or greater than a threshold in a multidimensional space including, as dimensions, a plurality of control parameters that define a machining condition.

8. The machining condition search device according to claim 1, comprising:
   a display to display an evaluation value generated by the machining evaluation circuitry and a machining condition corresponding thereto in association with each other, to display a prediction value generated by the prediction circuitry and a machining condition corresponding thereto in association with each other, and to display the optimum machining condition.

9. A machining condition search method comprising:
   generating a machining condition defined by one or more control parameters settable on a machining apparatus;
   causing the machining apparatus to perform machining based on the generated machining condition;
   generating an evaluation value of performed machining, on a basis of information indicating a machining result of the performed machining;
   predicting an evaluation value corresponding to a machining condition under which machining is not performed, on a basis of the evaluation value and the machining condition corresponding to the evaluation value;

obtaining an optimum machining condition on a basis of a prediction value obtained as a result of the prediction of the evaluation value and the generated evaluation value, the optimum machining condition being a machining condition under which an evaluation value is equal to or greater than a threshold and a tolerance is maximum;

calculating an index indicating uncertainty of the prediction; and determining, on a basis of the index, whether to end a search for a machining condition, wherein the evaluation value indicates that the larger the value, the better the machining result, and the generation of the machining condition, the performance of the machining based on the generated machining condition, the generation of the evaluation value, the prediction of the evaluation value, the calculation of the index, the obtainment of the optimum machining condition are repeated until the determination to end the search is made.

* * * * *